UNITED STATES PATENT OFFICE.

VOLNEY SMITH, OF SCHENECTADY, NEW YORK.

IMPROVEMENT IN COMPOUNDS FOR DENTAL PURPOSES.

Specification forming part of Letters Patent No. 127,656, dated June 4, 1872.

*To all whom it may concern:*

Be it known that I, VOLNEY SMITH, of Schenectady, in the county of Schenectady and State of New York, have invented a new and Improved Compound for Dental Plates; and I do hereby declare the following to be a full, clear, and exact description thereof, which will enable those skilled in the art to make and use the same.

This invention consists in a compound made of gun-cotton, prepared gum shellac, gum camphor, and a compound for the body and coloring matter, together with sulphuric ether and alcohol. The compound for the body is made of oxide of zinc, Chinese vermilion, and oxide of tin and gold.

In preparing this body I take the above-named ingredients in about the following proportion: Eight parts oxide of zinc; one part Chinese vermilion; one-fourth part oxide of tin and gold, the coloring matter to be varied according to shade required. After these ingredients have been thoroughly incorporated with each other I mix the compound thus obtained with the remaining ingredients in about the following proportion: Compound of the body, one part; shellac, one part; camphor, two parts; alcohol, ten parts; ether, twenty parts; gun-cotton, seven parts—for solvent.

In mixing these ingredients together the ether and alcohol, camphor and shellac, form solvents for the gun-cotton, and after the ingredients have all been mixed together (which operation may be facilitated by placing them in a machine which I have constructed for this purpose,) the mass is ready to be formed into plates of the required form. For this purpose I cut up the mass into pieces of the proper size and expose them to the atmosphere for six or eight days; then place them in a mold and submit to a heat of from 260° to 320° while being submerged in a vegetable oil.

By using shellac the article takes a higher finish and is prevented from shrinkage and warpage, which is a great desideratum, for if the plate shrinks it does not retain its position in the mouth. The shellac dissolves readily in alcohol at the ordinary temperature, and the ingredients are all mixed cold.

By submitting the plates to the action of heated vegetable oil the volatile parts are driven off, and the plate becomes tempered and properly hardened for the dentist's use.

When the plate comes into the dentist's hands it is placed on a form of plaster of Paris prepared for the occasion, the teeth are properly arranged thereon and the form is again submitted to heat in vegetable oil or other liquid or fluid at a temperature of from 260° to 320°, when the plate is ready for use.

By these means a plate is obtained which is free from odor or taste, not liable to shrinkage, void of all ingredients which would produce irritation or local or constitutional injury, strong and durable, light, and equal in appearance to the natural gum.

I do not claim mixing finely comminuted camphor gum with pyroxyiline pulp, neither do I claim mixing gums and resins with collodion or with a semi-liquid fluid produced by dissolving vegetable fiber in nitric or sulphuric acid, as such are not new.

What I claim as new, and desire to secure by Letters Patent, is—

A dental plate made of the ingredients specified and prepared substantially in the manner herein shown.

VOLNEY SMITH.

Witnesses:
D. A. ATWELL,
E. L. FREEMAN, 2D.